Sept. 27, 1932.  A. E. HUDD  1,879,613
AUTOMATIC TRAIN CONTROL SYSTEM
Original Filed Oct. 12, 1928   2 Sheets-Sheet 1
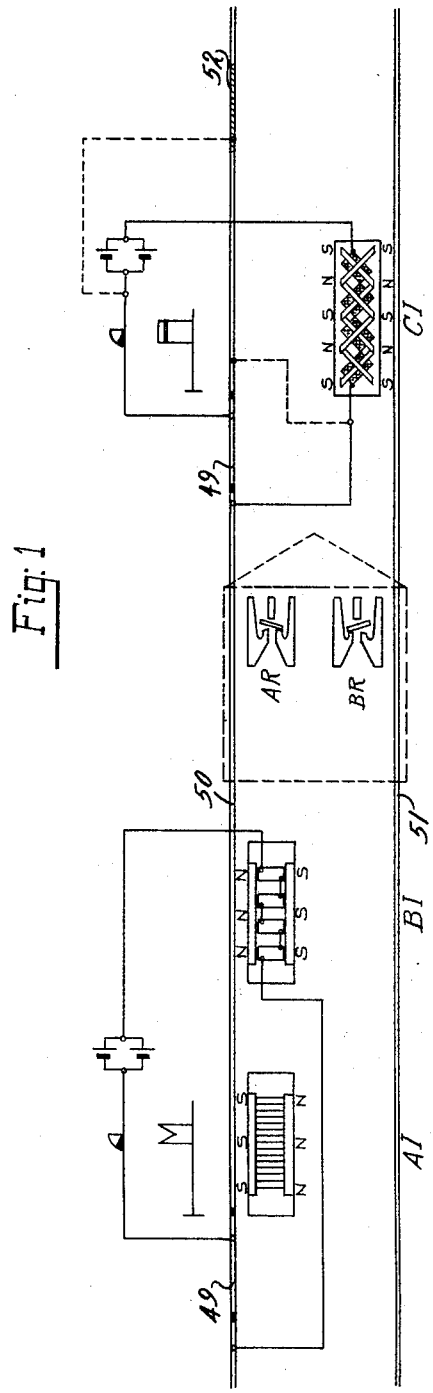
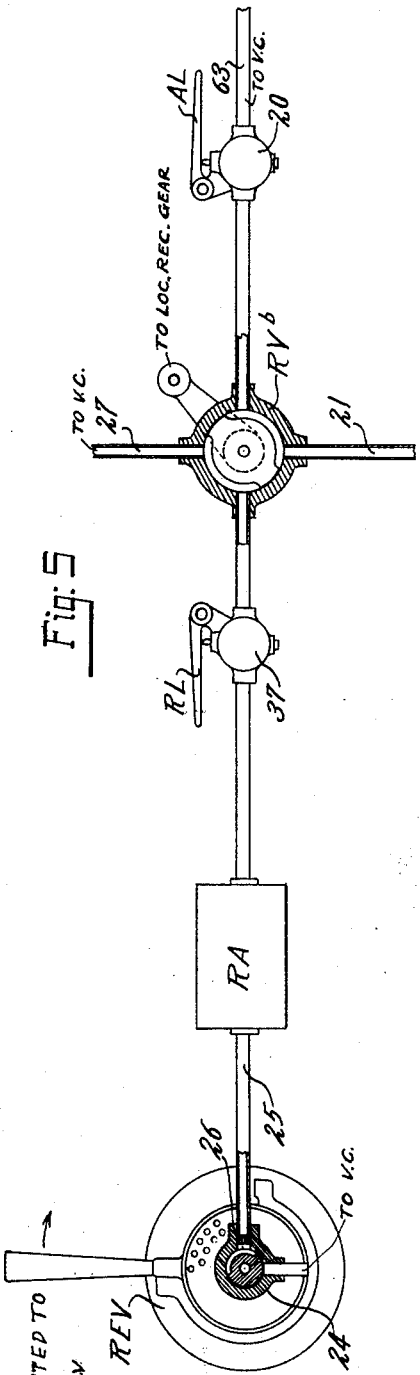
Inventor
Alfred E. Hudd

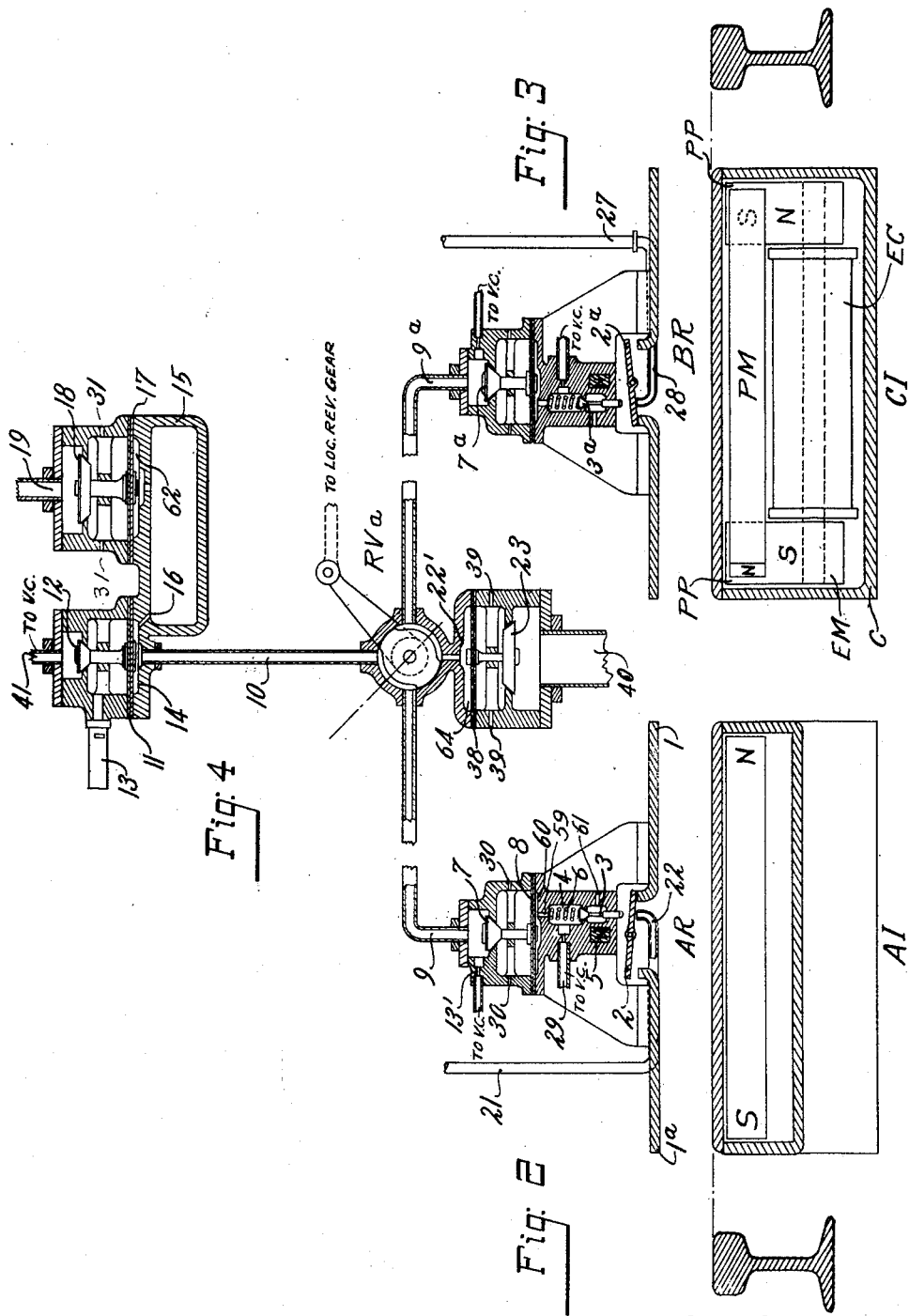

Patented Sept. 27, 1932

1,879,613

UNITED STATES PATENT OFFICE

ALFRED E. HUDD, OF LONG PARK, CHESHAM BOIS, ENGLAND, ASSIGNOR, BY MESNE ASSIGNMENTS, TO ASSOCIATED ELECTRIC LABORATORIES, INC., OF CHICAGO, ILLINOIS, A CORPORATION OF DELAWARE

AUTOMATIC TRAIN CONTROL SYSTEM

Application filed October 12, 1928, Serial No. 312,025, and in Great Britain February 9, 1928. Renewed May 25, 1932.

The present invention relates to automatic train control systems and more particularly concerns systems of the kind in which apparatus on the locomotive is adapted to be influenced by magnetic elements located along the track, although it is not necessarily limited for use in connection with such systems. The system may be advantageously used on railways where well known systems of railway signalling are employed, as for example, the block system.

The object of the present invention is to provide a system which is cheap to manufacture and install and has little or no maintenance costs, in which not only are there no electrical batteries but there are no electrical circuits on the locomotive.

The general arrangement of operation of the system, according to the invention, is that a warning signal is given to the engine-driver when passing apparatus at the side of the track under cautionary conditions and if he does not acknowledge such signal by performing a manual operation then the partial application of the brakes will take place automatically. On the other hand, if he passes apparatus at the side of the track under "stop" conditions then the brakes will be fully applied and he will be unable to remove the brake application until a definite time has elapsed.

One of the features of the invention relates to the arrangement of magnets along the track, a permanent magnet followed by an electro-magnet being provided for the purpose of giving a "caution" signal and eventually a partial brake application if the engine-man makes no acknowledgment, while a permanent magnet is provided for the purpose of effecting a full brake application instantaneously if it is not neutralized so as to have no effect whatever on the locomotive.

The invention also contemplates a novel arrangement for neutralizing a permanent magnet which is specially applicable for train control purposes and consists of arranging the permanent magnets diagonally with respect to the track electromagnets which are also arranged diagonally with respect to the track in a symmetrical relation to the permanent magnets as regards the line parallel to the direction of running of the trains, the poles of each electro-magnet lying in the same plane at right-angles to the track as the corresponding poles of the permanent magnet so that by energizing the electro-magnet in an appropriate way an armature in a magnetic circuit passing centralling over the magnetic system will be unaffected.

A further feature of the invention contemplates the automatic operation of a valve by the armature of the magnetic circuit controlled by magnets at the side of the track and consequently all the automatic brake controlling operations are effected pneumatically as well as the signals.

These and other features of the invention will be better understood by referring to the accompanying drawings, which illustrate one method of carrying the invention into effect as applied to systems employing the vacuum brake system of control although it will be understood that the invention is not limited to this type of system but is equally applicable to the compressed air system of control, and that various detail modifications could be made without departing from the spirit of the invention.

In the drawings, Fig. 1 illustrates a section of track showing the arrangement of the track elements and controlling circuits therefor. Figs. 2, 3, 4 and 5 illustrate the brake controlling apparatus on a locomotive and a cross section of the track, the track magnet for giving the partial brake application or "caution" signal being illustrated alongside the track magnet for giving a full brake application for the sake of convenience, although it will be understood that only one of these magnets normally would be seen in any cross section.

Referring now to Fig. 1, a section of the trackway is shown with one rail 50 divided into blocks, the other rail 51 being continuous. A permanent magnet or inductor AI is shown at the entrance to one section, this permanent magnet being made up of a plurality of permanent magnets arranged in parallel with poles of one polarity connected to one magnetic member and poles of the other polarity connected to another magnetic member. At a short distance from the permanent magnet the first electro-magnet or inductor BI is shown, said electro-magnet being constructed of a number of electro-magnets in parallel arranged as in the drawings. These two magnets are located between the rails at the left-hand side of the track with respect to the normal direction of motion of the locomotive. The second electro-magnet or inductor CI is arranged similarly but at the right-hand side of the track. This latter electro-magnet, which is effective only at "stop" or "danger" signals, is of peculiar construction in that a number of permanent magnets are arranged in the form of a series of V's with like poles adjacent to each other, while the same number of electro-magnets are similarly arranged and super-imposed on the permanent magnets in such a manner that when energized the polarities of the permanent magnets and the polarities of the electro-magnets are opposed to each other in a plane at right angles to the track so that the inductor CI has no effect on an armature on a passing locomotive, arranged in a magnetic circuit having poles lying laterally with respect to the track. When the electromagnets are de-energized, however, the permanent magnets alone are effective to influence such an armature.

The permanent magnets can conveniently be bar magnets, as shown more clearly in Fig. 3 where PM represents one of the permanent magnets. The electro-magnet EM with its exciting coil EC passes underneath the permanent magnet PM, as shown, and is provided with pole pieces PP at the ends which pole-pieces extend upwards to the plane in which the permanent magnets lie. The magnets are conveniently enclosed in a container C of non-magnetic material, as shown.

The electro-magnets of the inductors BI and CI are preferably energized only when a locomotive is passing. This is conveniently effected by providing a short insulated rail 49, between the sections of the rail 50, which insulated rail is electrically bridged through the wheels and frame of a passing locomotive to complete the energizing circuit when the signal track relay or the like is conditioned at "clear."

The respective inductors BI and CI, it should be understood, are so positioned with respect to rails 49 that the receivers AR and BR properly cooperate with BI and CI while the locomotive bridges across the insulation to complete the respective circuits for BI and CI.

Referring to Figs. 2, 3, 4 and 5 a brief description of the apparatus on a locomotive will now be given. It consists of two magnetic pick-up devices or receivers AR and BR located side by side which are adapted to be influenced by magnetic impulses received from the inductors located along the track. Receiver AR is normally adapted to be operated when a locomotive is passing track apparatus in a "clear" or "caution" condition, while the receiver BR is normally adapted to be operated when a locomotive is passing track apparatus in a "danger" condition; their respective functions, however, may be completely reversed, by the operation of the reversing valves RVa and RVb, when the locomotive is running tender first. The construction of the receivers AR and BR is substantially identical, receiver BR being complementary to receiver AR, so that when the locomotive is running tender first, receiver BR will operate in exactly the same relative manner as receiver AR and vice versa. The receiver AR is arranged to operate each time the locomotive passes over an inductor AI, to initiate a brake application and to operate a whistle valve so that a warning indication is given to the engineman every time so that he will know that he has passed over an "A" inductor such as AI. A partial brake application valve is also provided which tends to operate when the locomotive passes a de-energized "B" inductor such as BI, a full brake application valve being provided to operate when passing a de-energized "C" inductor such as CI. An acknowledging lever AL is provided which when depressed neutralizes the effect of the partial brake application valve. A releasing ejector valve REV of well known type and two reversing valves RVa, RVb, are provided, the latter being operated by a single operation when the locomotive is running tender first.

Having briefly described the apparatus on the locomotive and along the track a detailed description of the operation of the same will now be given.

In the first place, it will be assumed that a distant signal is at "clear." Under this condition the first electro-magnet or inductor BI will be energized when a locomotive passes over the insulated rail 49 immediately preceding. This energizing circuit extends from one terminal of the battery associated with the distant signal; through the switch, closed by said signal in "clear" position; the rail section 49, the frame of a vehicle of the train, to the upper rail of the track and through the windings of BI to the other terminal of the associated battery. The magnets of the trackway inductors are much more powerful than magnets 5, carried by the vehicle and, therefore, on passing over the inductor AI, the armature 2, which is polarized by the permanent magnet 5, of the receiver AR, will be operated to its alternate position. The magnetic flux passing from the inductor AI over the collector planes 1 and 1a will be such as to bring about this result. The magnet 5 will hold the armature in its alternate position after the inductor has been passed and until a stronger disturbing impulse is received thereby. The polarized armature 2 in moving to its alternate position raises the valve 3 which is held on its seat against atmospheric pressure by means of the spring 6, the chamber 4 being connected to the vacuum chamber through orifice 29. When valve 3 is lifted, therefore, chamber 4 is immediately raised to atmospheric pressure as it is now connected to atmosphere through valve 3 by means of opening 61; chamber 4 leads through the reduced opening 59 to the chamber 60 behind diaphragm 8 of valve 7, so that atmospheric pressure in this chamber will cause the diaphragm 8 to collapse, open valve 7, and admit atmospheric pressure through openings 30 to the pipe 9. Pipe 9 extends through the reversing valve RVa to pipe 10 and atmospheric pressure in space 14 behind the diaphragm 11 will now cause valve 12 to open and air will be admitted to pipe 41 extending to the vacuum chamber, through the whistle 13 which will therefore sound. The size of the ports of the valves 7 and 12 in comparison with the size of the port of valve 3 is such that atmospheric pressure will be almost instantaneously applied to the diaphragm 11 causing it to collapse, and consequently the whistle will sound practically at the same instant as valve 3 is opened. Pipe 9 is connected to the vacuum chamber through a restricted orifice 13' so that a rapid opening and closing of valve 3 will cause a comparatively long opening of the valve 12, thereby ensuring that a clear warning whistle is given at all speeds of the locomotive. On passing over the energized inductor BI in which the polarity of the electro-magnet is reversed with respect to the inductor AI the polarized armature 2 is restored to its initial position, whereupon the valve 3 is closed. The closing of valve 3 allows the vacuum to be restored in the pipes 9 and 10 and spaces 60 and 14 of valves 7 and 12, thereby closing said valves and effecting the stopping of the sounding of the whistle 13.

When the locomotive is passing a distant signal at "danger" the inductor BI will be de-energized as no circuit is completed when the locomotive wheel bridges the short insulating rail 49 on account of the semaphore switch being open while the semaphore blade is in danger position. On passing over the inductor AI the polarized armature 2 will be moved to its alternate position and the valve 3 opened, and the whistle sounded as before. In this case, however, the inductor BI is de-energized, wherefore the polarized armature 2 remains in its alternate position and the whistle continues to sound. The reservoir 15 is connected to the vacuum pipe 10 through the restricted orifice 16; hence after a predetermined time the vacuum in the reservoir 15 is reduced and atmospheric pressure is applied to the space 62 behind the diaphragm 17. This reduction of vacuum is gradual and is determined by the size of the reservoir 15 and the size of the restricted orifice 16. Usually a period of about 3 seconds would be allowed to elapse before there is sufficient pressure in space 62 to cause diaphragm 17 to collapse. It will therefore be seen that valve 18 does not open while valve 3 is opened when passing a signal at "clear" as the time that valve 3 is open is too short to allow the vacuum in chamber 15 to be sufficiently reduced. If, however, valve 3 remains open, then after approximately 3 seconds, valve 18 will open and admit atmospheric pressure through orifice 31 to the train pipe 19, so that a partial brake application is made. The amount of reduction of vacuum in the train pipe is determined by the size of the orifice 31. As valves 3, 7, 12 and 18 are now continuously open to atmospheric pressure, the whistle will continue to sound and the brakes will continue to be applied until an acknowledgment of the existing condition is made and conditions are restored to normal. For this purpose an acknowledging lever AL (Fig. 5) is provided which will be operated by the engine-man, if alert, to open valve 20 and connect pipes 21 through the valve RVb to pipe 63 extending to the vacuum chamber. There will be, therefore, a sudden suction of air through the opening 22, and the pipe 21 to the vacuum chamber. This inrush of air is sufficient to pull the polarized armature 2 back to its initial position, thereby again causing the valve 3 to close and allowing valves 7, 12 and 18 to close; then the whistle will cease to sound and the partial application of the brakes will cease.

On passing a "home" signal at "clear" the electro-magnets of the inductor CI will be energized over a circuit similar to that traced for inductor BI, and consequently as like poles of the inductor CI are encountered at the same time by the two collector planes of the receiver BR the armature of the receiver BR will not be affected.

If now the locomotive passes a "home" signal at "danger" the electro-magnets in the inductor CI will be de-energized, because the circuit of the electromagnets of CI will be open at the semaphore switch, so that now the collector planes of the receiver BR will encounter poles of opposite polarity on the inductor CI due to the rear part of one collector plane being opposite one pole while the front part of the other collector plane is opposite a dissimilar pole and vice versa. The polarized armature 2a of the receiver BR will therefore be moved to its alternate position in a similar manner to the operation of armature 2 of the receiver AR, and will operate valve 3a which admits atmospheric pressure to the chamber behind the diaphragm of valve 7a. Valve 7a will, therefore, open and admit atmospheric pressure to the pipe 9a, which extends to the space 64 behind the diaphragm of the full brake application valve 23. Atmospheric pressure in this space 64 will cause diaphragm 38 to collapse, and valve 23 to open, whereupon atmospheric pressure is admitted to the train pipe 40, through orifices 39, to effect a full automatic brake application. This automatic brake application cannot be released until a certain time has elapsed after the ejector valve has been operated by the engine-man. The existing airbrakes handle is connected to the special releasing ejector valve REV. When the brake handle is moved to the "on" position the reservoir RA is connected over pipe 25, to the vacuum chamber. The reservoir RA is therefore exhausted after a period determined by the size of the orifice 26 and the capacity of the said reservoir. This period may be varied from say 6 to 30 seconds. When the reservoir RA has its pressure sufficiently reduced the engine-man operates the releasing lever RL thereby opening the valve 37. In consequence the reservoir RA is connected through releasing valve 37, reversing valve RVb, and pipe 27 to the opening 28. Hence there will be a sudden rush of air through the opening 28 through the pipe 27, reversing valve RVb, releasing valve 37, to the reservoir RA. This rush of air is sufficient to pull the polarized armature 2a to its initial position, whereupon valve 3a is again closed and the automatic application of the brakes is released, control being now entirely in the hands of the engine-man. The opening 28 of the releasing pipe 27 is so proportioned that the polarized armature 2a cannot be pulled back to its initial position until the predetermined degree of vacuum has been produced in the reservoir RA.

Also, the duration of the effective suction applied to armature 2a is limited to the capacity of the reservoir RA owing to the restriction of the opening 26, wherefore it is impossible to give a prolonged pull at the suction outlet 28 to the armature 2a. The engine-man therefore, after receiving a full automatic brake application must, in order to effect the release of this application and to keep the locomotive under his own control first put his brake valve handle to the "on" position and then depress the releasing lever of the valve 37 after the requisite time has elapsed.

When now a locomotive is running on the track tender first, the engine-man will operate the reversing valves RVa and RVb which are connected to the reversing gear on the locomotive. The operation of these valves, as will be readily seen from the drawings, completely reverses the pipe connections to the two receivers AR and BR and to the operating valves 12, 18 and 23, so that when the locomotive is running under these conditions the functioning of the control system will be exactly the same as has already been described for forward running with the difference that receiver BR takes the place of receiver AR in controlling the clear and caution conditions, while receiver AR now controls the danger conditions.

An arrangement is also provided whereby when a locomotive is required to back, for instance out of a station, against a "stop" signal, the inductor CI at said signal is energized over a home insulated rail 52, independently of the signal, so that the inductor CI does not influence the receiver BR to initiate a brake application, the locomotive being allowed to back under the control of the engine-man and independently of the home position wayside signals. This circuit extends over the rail section 52, the associated battery, the windings of CI, through the rail section adjacent 52 and through the frame of the locomotive back to rail section 52. No provision has been made for backing beyond inductor AI, and a brake application will therefore be received irrespective of traffic conditions in case the train backs over one of these inductors.

It will be appreciated that a control system has been devised which is very simple in construction and extremely rugged, being dependent for its operation entirely on pneumatic means, with the exception of the magnetic pick-up arrangements, and that to those skilled in the art many detail modifications could be made without exceeding the scope of the invention.

What is claimed is:

1. In a train control system, vehicle carried inductive pick-up devices, there being one on each side of the vehicle, brake control devices on the vehicle, pneumatic means operated by said pick-up devices to selectively control said brake control devices, and a reversing valve operable to enable said pick-up devices to control different brake control devices according to whether the locomotive is running forward or backward.

2. In a train control system of the intermittent inductive type applied to a system wherein the trackway is divided up into blocks, a vehicle carried signal, a valve for causing the actuation of said signal to occur near the exit of each block irrespective of traffic conditions ahead, a second valve substantially simultaneously operative to initiate a limited brake application, a third valve operative to control said first and second valves and manually controlled means for controlling said third valve.

3. In a train control system of the intermittent inductive type applied to a system wherein the trackway is divided up into blocks, permanent and electro track magnets at the exit of each block, a two-position vehicle carried valve operable into one position by said permanent magnets and back into its initial position by said electro track magnets, a signalling device and a brake control device and other valves controlled by said first valve for controlling and causing the operation of said signalling device for initiating the operation of said brake controlling device and for also restoring said devices to their initial condition.

4. In a train control system, vehicle carried means comprising two valve devices operable by magnetic flux transmitted to them from a source of magnetism exterior to the vehicle, a signalling device, a valve device for causing a limited brake application to be initiated and a second valve device for causing a full brake application to occur, and trackway means effective to actuate said two valve devices to control said signalling and brake control devices in a manner dependent on traffic conditions ahead.

5. In a train control system, a valve, a polarized armature operable by magnetic induction to actuate said valve, and pneumatic means for restoring said armature and valve.

6. In a train control system of the intermittent inductive type, a valve operable by magnetism transmitted from sources exterior to the vehicle for initiating brake applications and again operable by magnetism transmitted from a source exterior to the vehicle to cancel the initiated applications when proceed traffic conditions prevail, and manually controlled pneumatic means for also operating said valves to bring about the cancellation when unfavorable traffic conditions prevail.

7. In a train control system a brake control valve magnetically operable to initiate a brake application, a signalling device also set into operation as a result of the operation of said valve, pneumatic means for delaying the brake application for a definite interval, and means effective to restore said valve, if operated prior to the expiration of said interval, to prevent the brake application and to silence said signal.

8. In a train control system, a vehicle signal, automatically controlled means for causing a limited brake application to be initiated and the signal to be actuated, manually controlled means for cancelling the initiation of a limited brake application and for stopping the sounding of said signal, other brake control apparatus for automatically causing a full brake application to be made, and means for preventing manual interference with the application in the latter instance until a predetermined time has expired following the application.

9. In a train control system, trackway magnets placed along a section of trackway, vehicle carried train control valves having operating members so located with respect to the trackway magnets that the vehicle in passing said magnets carries said members through the fields of said magnets causing at least one of said members to operate, irrespective of traffic conditions and the other to operate if traffic conditions are unfavorable and manually controlled pneumatic means for restoring the respective members to their initial positions.

10. In a train control system, a trackway inductor, a vehicle carried valve having an operating member carried by the vehicle into and out of operative relation with said inductor and operated by said inductor or not depending on traffic conditions, and manually controlled pneumatic means for operating said member in case the same has not been operated by said inductor.

11. In a train control system, means for causing a limited brake application to be initiated, means for slightly delaying such brake application, manually controlled means for cancelling the initiated brake application either before or after the expiration of the delay, other brake control apparatus for automatically causing a full brake application to be made, and means for preventing manual interference with the brake application in the latter instance until a predetermined time has expired following the application.

12. In a train control system, applied to a railway system in which the trackway is divided into block sections and in which each section is provided with distant and home signal locations respectively, a trackway magnet at the distant location, another trackway magnet at the home location, a vehicle carried means having an armature attracted from one position to another upon passing a magnet at the distant location to initiate a limited brake application; another magnet at the distant location effective under clear traffic conditions to again operate said armature to neutralize the effect of the first encountered trackway magnet; other vehicle carried means operative upon passing the magnet at the home location, under danger traffic conditions, for initiating a full brake application, and means for preventing said last magnet from functioning to initiate an application under clear traffic conditions.

In witness whereof, I hereunto subscribe my name this 9th day of October, A. D. 1928.

ALFRED E. HUDD.